United States Patent
Kamerbeek

(10) Patent No.: US 12,275,579 B2
(45) Date of Patent: Apr. 15, 2025

(54) SYSTEM FOR PREPARING A BEVERAGE FROM A CAPSULE USING A FLUID SUPPLIED UNDER PRESSURE INTO THE CAPSULE AND A CAPSULE FOR USE IN SUCH A SYSTEM

(71) Applicant: Koninklijke Douwe Egberts B.V., Utrecht (NL)

(72) Inventor: Ralf Kamerbeek, De Meern (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 874 days.

(21) Appl. No.: 17/416,083

(22) PCT Filed: Dec. 18, 2019

(86) PCT No.: PCT/NL2019/050853
§ 371 (c)(1),
(2) Date: Jun. 18, 2021

(87) PCT Pub. No.: WO2020/130819
PCT Pub. Date: Jun. 25, 2020

(65) Prior Publication Data
US 2022/0073269 A1 Mar. 10, 2022

(30) Foreign Application Priority Data
Dec. 20, 2018 (NL) .................................. 2022269

(51) Int. Cl.
*B65D 85/804* (2006.01)
*A47J 31/06* (2006.01)
*A47J 31/36* (2006.01)

(52) U.S. Cl.
CPC ...... *B65D 85/8064* (2020.05); *A47J 31/0668* (2013.01); *A47J 31/0684* (2013.01); *A47J 31/369* (2013.01)

(58) Field of Classification Search
CPC .............. B65D 85/804; B65D 85/8043; B65D 85/8046; B65D 85/8049; B65D 85/8052;
(Continued)

(56) References Cited

U.S. PATENT DOCUMENTS

| 2017/0081112 A1* | 3/2017 | Cabilli ................. A47J 31/407 |
| 2018/0105355 A1* | 4/2018 | Harif ................. B65D 85/8064 |
| 2020/0391935 A1* | 12/2020 | Bambagioni ...... B65D 85/8046 |

FOREIGN PATENT DOCUMENTS

| AT | 517145 | 11/2016 |
| EP | 1700548 | 9/2006 |

(Continued)

OTHER PUBLICATIONS

European Third Party Observation dated Feb. 19, 2024, Application No. 19835536.4 (25 pgs.).

(Continued)

*Primary Examiner* — Hung D Nguyen
(74) *Attorney, Agent, or Firm* — Fitch, Even, Tabin & Flannery LLP

(57) ABSTRACT

The invention relates to a system for preparing a beverage from a capsule using a fluid supplied under pressure into the capsule comprising a beverage preparation device having an enclosing member with an annular element having a free contact end and a capsule containing a substance for the preparation of a beverage. The capsule comprises a sealing member having the shape of a step. The sealing member comprises a floor portion extending over an engagement distance and a side wall portion extending in a direction away from the floor portion. The engagement distance of the floor portion is such that the floor portion engages the free contact end of the annular element over if the capsule is positioned in the enclosing member of the beverage prepa-
(Continued)

Figure 1A:
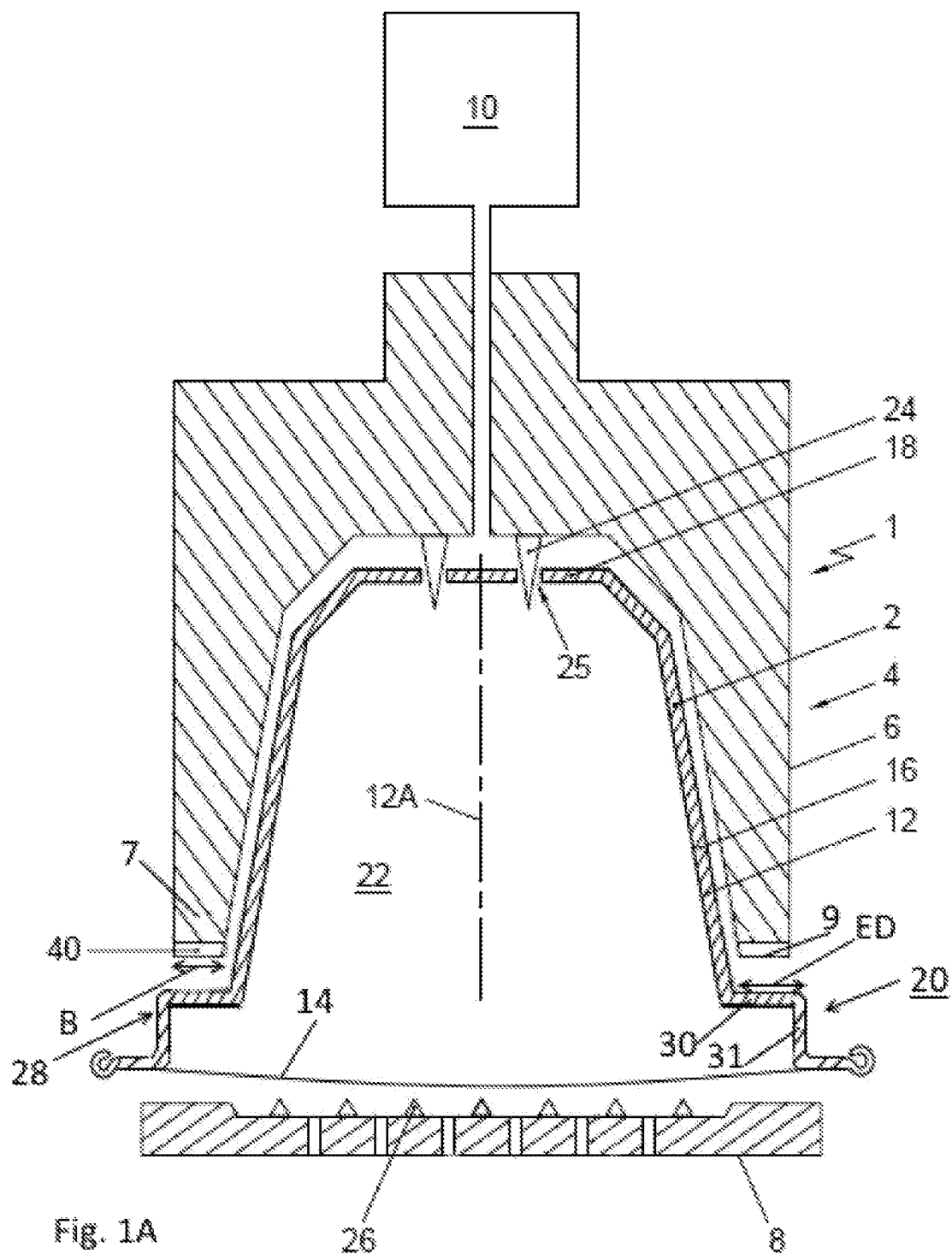

ration device and is moved relative towards a capsule holder of the beverage preparation device.

7 Claims, 3 Drawing Sheets

(58) Field of Classification Search
CPC .............. B65D 85/8064; A47J 31/0668; A47J 31/0673; A47J 31/0684; A47J 31/34; A47J 31/36; A47J 31/3623; A47J 31/3628; A47J 31/3633; A47J 31/369; A47J 31/3695; A47J 31/407; A47J 31/4403
See application file for complete search history.

(56) References Cited

FOREIGN PATENT DOCUMENTS

| EP | 1839543 | | 10/2007 |
|---|---|---|---|
| WO | 2015092712 | | 6/2015 |
| WO | 2016186492 | | 11/2016 |
| WO | 2018067013 | A1 | 4/2018 |
| WO | 2020053075 | A1 | 3/2020 |

OTHER PUBLICATIONS

International Search Report and Written Opinion date of mailing Feb. 14, 2020, International Applicaiton No. PCT/NL2019/050853 (9 pgs.).

\* cited by examiner

SYSTEM FOR PREPARING A BEVERAGE FROM A CAPSULE USING A FLUID SUPPLIED UNDER PRESSURE INTO THE CAPSULE AND A CAPSULE FOR USE IN SUCH A SYSTEM

CROSS REFERENCE TO RELATED APPLICATIONS

This application is a U.S. national phase application of International Application No. PCT/NL2019/050853, filed Dec. 18, 2019, which claims benefit from the Netherlands Application 2022269, filed Dec. 20, 2018, which are each hereby incorporated herein by reference in their entirety.

FIELD

The invention relates to a system for preparing a beverage from a capsule using a fluid supplied under pressure into the capsule. The invention also relates to a capsule for use in such a system.

BACKGROUND

Such a capsule and system are known from EP-B-1 654 966. In the known system the capsule is provided with a sealing member having the shape of a step, i.e. a sudden increase of the diameter of the side wall of the capsule, and the enclosing member of this known system has a sealing surface acting on the sealing member to provide deflection of the sealing member, the sealing surface being inclined so that the deflection of the sealing member is an inwards and downwards deformation of the step. Furthermore in the known system the enclosing member comprises a capsule holder and a manually operated or an automatic mechanism for relative displacement of the enclosing member and the capsule holder. The manually operated or automatic mechanism applies a force on the sealing member of the capsule when the enclosing member closes on the capsule holder. This force should ensure the fluid tight seal between the enclosing member and the capsule. Because the manually operated or automatic mechanism is arranged to be moved relative to the base, the sealing capabilities of the system can depend on the pressure of the fluid injected by the fluid injection means. If the pressure of the fluid increases, the force between the sealing member of the capsule and the free end of the enclosing member increases too and thereby the force between the sealing member of the capsule and the free end of the enclosing member increases also. Such a system is described further on. The sealing member of the capsule must be arranged such that upon reaching the maximum fluid pressure in the enclosing member the sealing member should still provide a fluid sealing contact between the enclosing member and the capsule. However, the sealing member must also be arranged such that prior to, or at the start of, brewing when the pressure of the fluid in the enclosing member outside the capsule is relatively low, the sealing member also provides a fluid sealing contact between the enclosing member and the capsule. If at the start of brewing, there would not exist a fluid sealing contact between the capsule and the enclosing member, leakage will occur. However, if leakage occurs there is a real chance that the pressure in the enclosing member and outside the capsule will not sufficiently increase for increasing the force on the sealing member by means of the free end of the enclosing member if the manually operated or automatic mechanism moves the enclosing member towards the capsule holder. Only if there is a sufficient initial sealing, the pressure in the enclosing member will increase whereby also the force of the free end of the enclosing member acting on the sealing member of the capsule will increase for providing a sufficient fluid sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

It follows from the above that the sealing member is a member which is very critical in design. It should be able to provide a fluid sealing contact between the enclosing member and the capsule at a relatively low fluid pressure if only a relatively small force is applied on the sealing member by means of the free end of the enclosing member but it should also provide a fluid sealing contact at a much higher fluid pressure in the enclosing member outside the capsule if a higher force is applied by means of the free end of the enclosing member to the sealing member of the capsule. In particular when the free contact end of the enclosing member is provided with radially extending open grooves which act as air inlet passage once the force between the enclosing member and the capsule holder is released so that it is easier for a user to take out the capsule, the sealing member must also be able to 'close' the radially extending open grooves to provide an effective seal.

SUMMARY

It is an object of the invention to provide an alternative sealing member which is relatively easy to manufacture, which is environmentally friendly if the capsule is disposed of after use and/or which provide a satisfactory sealing even in case of an enclosing member of which the free contact end is provided with radially extending open grooves.

The invention has also as an object to provide an alternative system for preparing a beverage from a capsule in a beverage preparation device.

In accordance with the invention there is provided in a first aspect a system for preparing a beverage from a capsule using a fluid supplied under pressure into the capsule comprising:
 a beverage preparation device comprising an enclosing member for receiving the capsule, wherein the enclosing member comprises fluid injection means for supplying fluid under pressure into the capsule, wherein the beverage preparation device further comprises a capsule holder, such as an extraction plate, the enclosing member and the capsule holder being relatively movable for closing the enclosing member of the beverage preparation device by the capsule holder, wherein the enclosing member of the beverage preparation device further comprises an annular element having a breadth, a central annular element axis and a free contact end, said free contact end of the annular element optionally being provided with a plurality of radially extending open grooves;
 a capsule containing a substance for the preparation of a beverage by extracting and/or dissolving the substance by means of the fluid supplied under pressure into the capsule by the fluid injection means of the beverage preparation device, wherein the capsule comprises a capsule body made from aluminum or an aluminum alloy and having a central capsule body axis, said capsule body being provided with a bottom, a side wall and an outwardly extending flange, the capsule further comprising a cover, preferably an aluminum cover attached to the outwardly extending flange, the cover hermetically closing the capsule, the capsule being designed for insertion into the beverage preparation device, wherein the capsule further comprises a sealing member formed by the outwardly extending flange for providing a fluid sealing contact with the enclosing member of the beverage preparation device if the capsule is positioned in the enclosing member of the beverage preparation device and the enclosing member is closed by means of the capsule holder of the beverage preparation device, such that the outwardly extending flange of the capsule including at least a portion of the sealing member of the capsule are sealingly engaged between the enclosing member and the capsule holder of the beverage preparation device, wherein, prior to insertion, the sealing member has the shape of a step, i.e. a sudden increase of the diameter of the side wall of the capsule, the sealing member comprising a floor portion substantially extending transverse to the central capsule body axis over an engagement distance and a side wall portion extending in a direction away from the floor portion, wherein the capsule body including the bottom, side wall, flange and sealing member are manufactured from a sheet shaped material made from aluminum or an aluminum alloy, characterized in that said engagement distance of the floor portion is such that the floor portion engages the free contact end of the annular element over its breadth if the capsule is positioned in the enclosing member of the beverage preparation device and the enclosing member is moved relative towards the capsule holder of the beverage preparation device, the floor portion being arranged to be plastically drawn over the free contact end of the annular element if the enclosing member of the beverage preparation device is closed by means of the capsule holder of the beverage preparation device.

Since the engagement distance of the floor portion is such that the floor portion engages the free contact end of the annular element over its breadth if the capsule is positioned in the enclosing member of the beverage preparation device and the enclosing member is moved relative towards the capsule holder of the beverage preparation device, and the floor portion is arranged to be plastically drawn over the free contact end of the annular element if the enclosing member of the beverage preparation device is closed by means of the capsule holder of the beverage preparation device, during the step of closing the enclosing member relative to the capsule holder the floor portion of the capsule is contacted by the enclosing member to deform the floor portion side wall. In particular, the free contact end enters bears on the floor portion. The floor portion is driven downwards by the action of the enclosing member to finally nip the floor portion against the capsule holder. This downwards movement causes the floor portion to be plastically drawn, or folded, over and into sealing engagement with the free contact end of the annular element, which encourages the material of the floor portion to be closely conformed to the free contact end, in particular to possible grooves of the free contact end. The floor portion is thus plastically drawn, or folded, over and into sealing engagement with the free contact end of the annular element as a result of the shape of the sealing member, i.e. the floor portion which extends horizontal and is relatively broad in comparison with the free contact end of the enclosing member, i.e. the floor portion extends over the breadth of the free contact end of the enclosing member. Because upon closing of the enclosing member the floor portion is plastically drawn over the free contact end of the annular element an excellent sealing engagement between capsule and enclosing member is obtained.

In an embodiment of a system according to the invention the floor portion comprises a weakening, such as a crease, an indent or a reduced thickness, preferably in a central portion thereof, so that the manner in which the floor portion is plastically deformed, or folded, can be made more defined. The floor portion is thus plastically drawn, or folded, over and into sealing engagement with the free contact end of the annular element as a result of the shape of the sealing member, i.e. the floor portion which extends horizontal and is relatively broad in comparison with the free contact end of the enclosing member, i.e. the floor portion extends over the breadth of the free contact end of the enclosing member, and in combination with the weakening of the floor portion.

In a further embodiment of a system according to the invention the floor portion projects radially outward over the free contact end of the annular element over a distance of at least half the breadth of the free contact end if the capsule is positioned in the enclosing member of the beverage preparation device and the enclosing member of the beverage preparation device is closed by means of the capsule holder of the beverage preparation device. In this manner it is ensured that upon closing of the enclosing member the floor portion is plastically drawn over the full breadth of the free contact end of the annular element an excellent sealing engagement between capsule and enclosing member is obtained.

In a further embodiment of a system according to the invention the bottom, the side wall, the flange and the sealing member are integrally formed. Preferably the capsule body including the bottom, the side wall, the flange and the sealing member are formed by deep drawing sheet like material.

In accordance with the invention there is provided in a second aspect a capsule for use in such a system. In a preferred embodiment of the capsule the floor portion comprises a weakening, preferably in a central portion thereof.

BRIEF DESCRIPTION OF THE FIGURES AND DETAILED DESCRIPTION

Figure 1B:
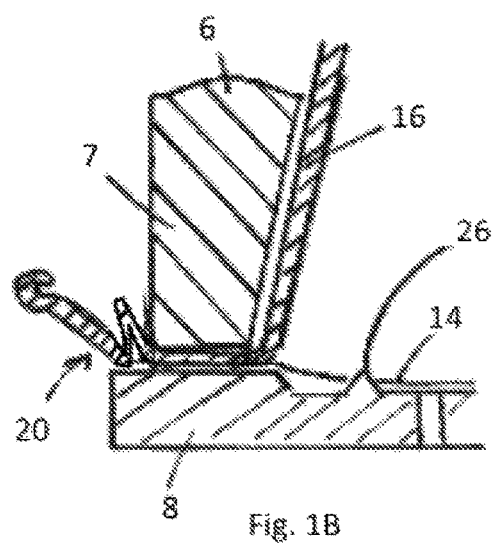
Figure 2B:
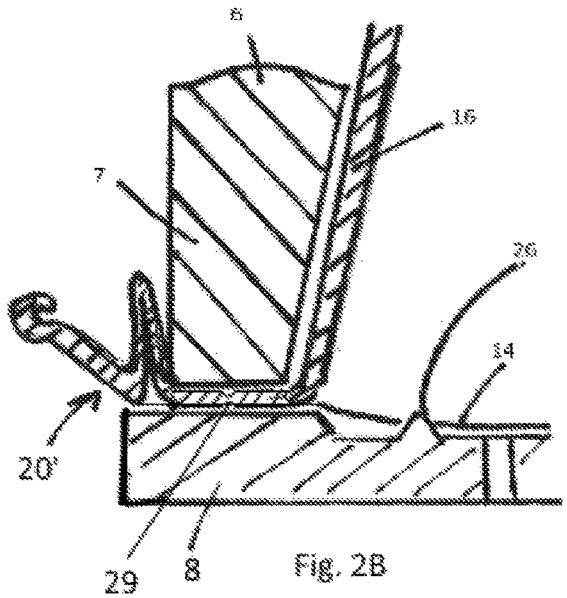
Figure 3B:
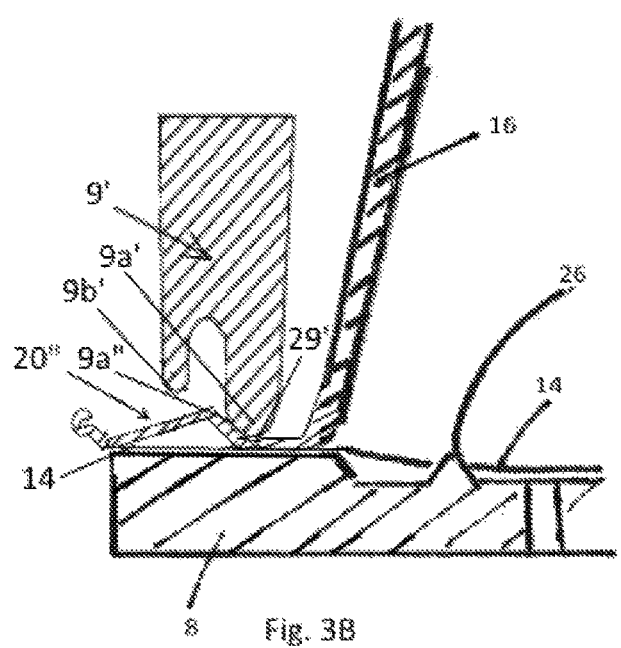
Figure 2A:
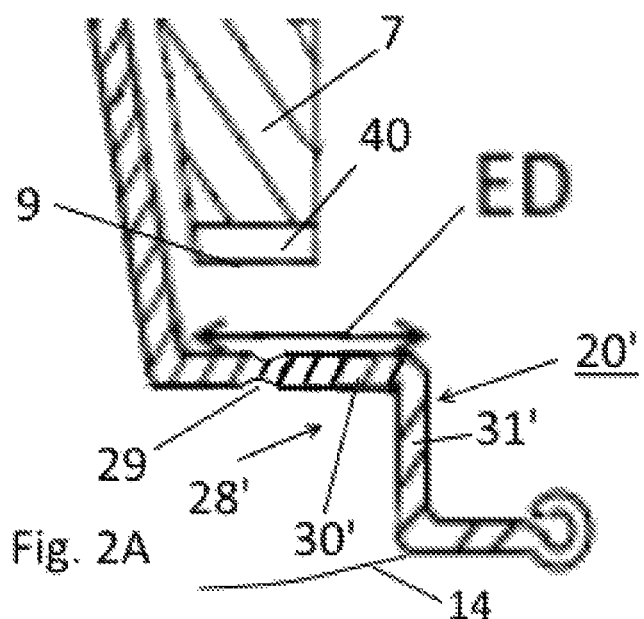
Figure 3A:
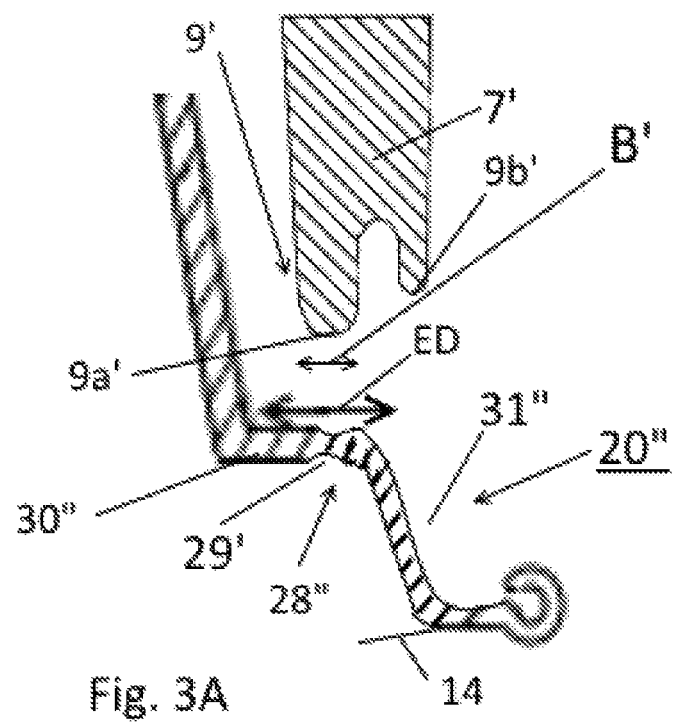

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIGS. 1A and 1B show a schematic representation, in cross sectional view, of a first embodiment of a system according to the invention for preparing a beverage from a capsule using a fluid supplied under pressure into the capsule, in which the sealing member of the capsule comprises a floor portion with a uniform thickness, in a situation in which the enclosing member is spaced from the capsule holder (FIG. 1A) and in a situation in which the enclosing member contacts the capsule holder (FIG. 1B);

FIGS. 2A and 2B schematically show an enlarged portion of a second embodiment of a system according to the invention for preparing a beverage from a capsule using a fluid supplied under pressure into the capsule, in which the sealing member of the capsule comprises a floor portion with a weakening, in a situation in which the enclosing member is spaced from the capsule holder (FIG. 2A) and in a situation in which the enclosing member contacts the capsule holder (FIG. 2B); and FIGS. 3A and 3B schematically shows an enlarged portion of a third embodiment of a system according to the invention for preparing a beverage from a capsule using a fluid supplied under pressure into the capsule, in a situation in which the enclosing member is spaced from the capsule holder (FIG. 3A) and in a situation in which the enclosing member contacts the capsule holder (FIG. 3B), in which the sealing member of the capsule comprises a floor portion with a weakening and in which the free end of the annular element of the enclosing member has a construction different from the embodiment shown in FIG. 2.

FIG. 1A shows a schematic representation, in cross sectional view, of an embodiment of a system 1 for preparing a beverage from a capsule 2 using a fluid supplied under pressure into the capsule 1. In addition to the capsule 2 the system 1 comprises a beverage preparation device 4. The beverage preparation device 4 comprises an enclosing member 6 for receiving and holding the capsule 2. The beverage preparation device 4 further comprises a capsule holder, such as an extraction plate, 8 for supporting the capsule 2.

In FIG. 1A a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The beverage preparation device 4 further comprises a fluid injection means 10 for supplying an amount of a fluid, such as water, under a pressure in the range of 6-20 bar, preferably between 12 and 18 bar, to the exchangeable capsule 2.

The enclosing member 6 and the capsule holder 8 being relatively movable for closing the enclosing member 6 of the beverage preparation device by the capsule holder 8. The enclosing member 6 of the beverage preparation device 4 further comprises an annular element 7 having a breadth B, a central annular element axis 12A and a free contact end 9. In the example shown in FIG. 1A, the exchangeable capsule 2 comprises a capsule body 12 made from aluminum or an aluminum alloy, herein also called aluminum capsule body, having a central capsule body axis 12A and an aluminum cover 14 with a cover wall thickness. In this example, the aluminum capsule body 12 comprises a side wall 16, a bottom 18 closing the side wall 16 at a first end, and a outwardly extending flange 20 extending outwardly of the circumferential wall 16 at a second end opposite the bottom 18. The capsule body 12 including the bottom 18, the side wall 16, the flange 30 and a sealing member 28 (discussed below) are manufactured from a sheet shaped material made from aluminum or an aluminum alloy. Preferably the bottom, side wall, flange and seal are integrally formed, in particular by deep drawing the sheet like material. The side wall 16, the bottom 18 and the cover 14 enclose an inner space 22 comprising a substance for the preparation of a beverage by extracting and/or dissolving the substance. Preferably the substance is an extractable substance, preferably 5-20 grams, preferably 5-10 grams, more preferably 5-7 grams of roasted and ground coffee for the preparation of a single beverage. The capsule is initially sealed, i.e. is hermetically closed prior to use.

The fluid injection means 10 of the system 1 of FIG. 1A further comprises bottom piercing means 24 for piercing the bottom 18 of the capsule 2 for creating at least one entrance opening 25 in the bottom 18 for supplying the fluid to the extractable product through the entrance opening 25.

The capsule holder 8 of the system 1 of FIG. 1A further comprises cover piercing means 26, here embodied as protrusions of the capsule holder 8, for piercing the cover 14 of the capsule 2. The cover piercing means 26 may be arranged to tear the cover 14 once a (fluid) pressure inside the inner space 22 exceeds a threshold pressure and the cover 14 is pressed against the cover piercing means 26 with sufficient force. The aluminum cover 14 thus is arranged to tear open on the capsule holder 8 of the beverage preparation device 4 under the influence of fluid pressure in the capsule 2.

The capsule 2 further comprises a sealing member 28 formed by the outwardly extending flange 20 for providing a fluid sealing contact with the enclosing member 6 of the beverage preparation device 4 if the capsule 2 is positioned in the enclosing member 6 of the beverage preparation device 4 and the enclosing member 6 is closed by means of the capsule holder 8 of the beverage preparation device 4 (see FIG. 1B), such that the outwardly extending flange 20 of the capsule 2 including at least a portion of the sealing member 28 of the capsule are sealingly engaged between the enclosing member 6 and the capsule holder 8 of the beverage preparation device 4. Prior to insertion, the sealing member 28 has the shape of a step, i.e. a sudden increase of the diameter of the side wall 16 of the capsule 2 and it comprises a floor portion 30 substantially extending transverse to the central capsule body axis 12A over an engagement distance ED. The sealing member 28 further comprises a side wall portion 31 extending in a direction away from the floor portion 30. In the embodiment shown in FIG. 1A the floor portion 30 has a substantially uniform thickness and the side wall portion 31 is substantially parallel to the central body axis 12A.

The engagement distance ED of the floor portion 30 is such that the floor portion 30 engages the free contact end 9 of the annular element 7 over its breadth B if the capsule 2 is positioned in the enclosing member 6 of the beverage preparation device 4 and the enclosing member 6 is moved relative towards the capsule holder 8 of the beverage preparation device 8. The floor portion 30 is arranged to be plastically drawn over the free contact end 9 of the annular element 7 if the enclosing member 6 of the beverage preparation device 4 is closed by means of the capsule holder 8 of the beverage preparation device 4 (see FIG. 1B). Thus, during the step of closing the enclosing member 6 relative to the capsule holder 8 the floor portion 30 of the sealing member 28 of the capsule 2 is contacted by the enclosing member 6 in particular the free contact end 9 thereof to deform the floor portion 30 and the floor portion side wall 31. In particular, the free contact end 9 bears on the floor portion 30. The floor portion 30 is then driven downwards by the movement of the enclosing member 6 to finally nip the floor portion 30 against the capsule holder 8. This downwards movement causes the floor portion 30 to be plastically drawn, or folded, over and into sealing engagement with the free contact end 9 of the annular element 7, which encourages the material of the floor portion 30 to be closely conformed to the free contact end 9, in particular to be closely conformed to possible grooves 40 of the free contact end 9. Because upon closing of the enclosing member 6 the floor portion 30 is plastically drawn over the free contact end 9 of the annular element 7 an excellent sealing engagement between capsule 2 and enclosing member 6 is obtained.

In the embodiments shown in FIGS. 2A and 3A the floor portion 30', 30" of the sealing member 28', 28" comprises a weakening 29, 29' preferably in a central portion thereof. The weakening 29, 29' can be provided as a crease, an indent or a portion of the floor portion 30', 30" having a reduced thickness. By the provision of the weakening 29, 29' the manner in which the floor portion 30', 30" and the side wall portion 31', 31" are plastically deformed, or folded (shown in FIGS. 2B and 3B), can be made more defined. In the embodiment of FIG. 3B sealing takes place on the final end of the free contact end 9' and on the adjacent radially outward laying outer surface 9a" of the free contact end 9'.

In the embodiment shown in FIG. 3A the side wall portion 31" of the sealing member 28" encloses an angle with regard to the central capsule body axis 12A, such that the manner in which the floor portion 30" and the side wall portion 31" are plastically deformed, or folded, can be made even more defined, as seen in FIG. 3B. In addition, in the embodiment shown in FIGS. 3A and 3B the annular element 7' differs from the annular element 7 in that its free contact end 9' is not provided with grooves, and in that the free contact end 9' comprises two projections 9a', 9b' of which the inner projection 9a' extends further towards the capsule holder 8 than the outer projection 9b'. The floor portion 30" is arranged to be plastically drawn, over the free contact end 9' of the annular element 7', in particular over the inner projection 9a', if the enclosing member of the beverage preparation device is closed by means of the capsule holder of the beverage preparation device.

The first, second and third embodiment of the system according to the invention also differ from each other in the extent, i.e. the distance over which the floor portions 30, 30,' 30" project radially outward over and beyond the free contact end 9, 9' of the annular element 7, 7'. In the embodiment shown in FIG. 1A the floor portion 30 radially extends beyond the free contact end 9 over a distance of about 10-18% of the breadth B of the free contact end 9.

In the embodiment shown in FIG. 2A the floor portion 30' radially extends further beyond the free contact end 9 than in the embodiment shown in FIG. 1A. The distance over which the floor portion 30' extends beyond the free contact end 9 is substantially equal to the breadth B of the free contact end 9 itself.

In the embodiment shown in FIG. 3A the floor portion 30" radially extends even further beyond the free contact end 9' than in the embodiments shown in FIGS. 1A and 2A (relatively). The distance over which the floor portion 30" extends beyond the free contact end 9' is here substantially twice the breadth B' of the free contact end 9' itself.

In case the floor portion of the sealing member extends over a distance of at least half the breadth of the free contact end if the capsule is positioned in the enclosing member of the beverage preparation device and the enclosing member of the beverage preparation device is closed by means of the capsule holder of the beverage preparation device, it has appeared that it is ensured that upon closing of the enclosing member the floor portion is plastically drawn over the full breadth of the free contact end of the annular element an excellent sealing engagement between capsule and enclosing member is obtained.

The invention claimed is:
1. System for preparing a beverage from a capsule using a fluid supplied under pressure into the capsule comprising:
a beverage preparation device comprising an enclosing member for receiving the capsule, wherein the enclosing member comprises fluid injection means for supplying fluid under pressure into the capsule, wherein the beverage preparation device further comprises a capsule holder, the enclosing member and the capsule holder being relatively movable for closing the enclosing member of the beverage preparation device by the capsule holder, wherein the enclosing member of the beverage preparation device further comprises an annular element having a breadth, a central annular element axis and a free contact end;
the capsule containing a substance for the preparation of a beverage by extracting and/or dissolving the substance by means of the fluid supplied under pressure into the capsule by the fluid injection means of the beverage preparation device, wherein the capsule comprises a capsule body made from aluminum or an aluminum alloy and having a central capsule body axis, said capsule body being provided with a bottom, a side wall and an outwardly extending flange, wherein a diameter of the side wall of the capsule comprises a sudden increase to form a step, the capsule further comprising a cover attached to the outwardly extending flange, the cover hermetically closing the capsule, the capsule being designed for insertion into the beverage preparation device, wherein the capsule further comprises a sealing member formed by the outwardly extending flange for providing a fluid sealing contact with the enclosing member of the beverage preparation device if the capsule is positioned in the enclosing member of the beverage preparation device and the enclosing member is closed by means of the capsule holder of the beverage preparation device, such that the outwardly extending flange of the capsule including at least a portion of the sealing member of the capsule are sealingly engaged between the enclosing member and the capsule holder of the beverage preparation device, wherein, prior to insertion, the sealing member being formed by the step, and comprising a floor portion extending transverse to the central capsule body axis over an engagement distance and a side wall portion extending in a direction away from the floor portion and in a direction away from the bottom of the capsule and toward the outwardly extending flange such that the floor portion is axially offset relative to the outwardly extending flange, wherein the capsule body including the bottom, side wall, flange and sealing member are manufactured from a sheet shaped material made from aluminum or an aluminum alloy, wherein said engagement distance of the floor portion is such that the floor portion engages the free contact end of the annular element over its breadth if the capsule is positioned in the enclosing member of the beverage preparation device and the enclosing member is moved relative towards the capsule holder of the beverage preparation device, the floor portion being arranged to be plastically drawn over the free contact end of the annular element if the enclosing member of the beverage preparation device is closed by means of the capsule holder of the beverage preparation device, wherein the floor portion comprises a weakening formed by a portion of the floor portion having a reduced thickness.
2. System according to claim 1, wherein the floor portion projects radially outward over the free contact end of the annular element over a distance of at least half the breadth of the free contact end if the capsule is positioned in the enclosing member of the beverage preparation device and the enclosing member of the beverage preparation device is closed by means of the capsule holder of the beverage preparation device.

3. System according to claim 1, wherein the bottom, side wall, the flange and the sealing member are integrally formed.

4. System according to claim 1, wherein the capsule body including the bottom, the side wall, the flange and the sealing member are formed by deep drawing a sheet like material.

5. A capsule for use in a system according to claim 1, wherein the capsule contains a substance for the preparation of a beverage by extracting and/or dissolving the substance by means of the fluid supplied under pressure into the capsule, wherein the capsule comprises a aluminum capsule body made of aluminum or an aluminum alloy having a central capsule body axis, said aluminum capsule body being provided with a bottom, a side wall and an outwardly extending flange, wherein a diameter of the side wall of the capsule comprises a sudden increase to form a step, the capsule further comprising a cover, attached to the outwardly extending flange, the cover hermetically closing the capsule, the capsule further comprising a sealing member formed by the outwardly extending flange, the sealing member being formed by the step and comprising a floor portion extending transverse to the central capsule body axis over an engagement distance and a side wall portion extending in a direction away from the floor portion and in a direction away from the bottom of the capsule, wherein the capsule body including the bottom, the side wall, the flange and the sealing member are manufactured from a sheet shaped material made from aluminum or an aluminum alloy, wherein the floor portion comprises a weakening, formed by a portion of the floor portion having a reduced thickness.

6. Capsule according to claim 5, wherein the portion of the floor portion having a reduced thickness is arranged in a central portion of the floor portion.

7. System according to claim 1, wherein the portion of the floor portion having a reduced thickness is arranged in a central portion of the floor portion.

\* \* \* \* \*